United States Patent [19]
Hayward

[11] 3,765,304
[45] Oct. 16, 1973

[54] COPYING DEVICES FOR MILLING MACHINES
[75] Inventor: Walter Francis Hayward, Wolverhampton, England
[73] Assignee: Hampson Jig, Tool and Automation, Limited, Wolverhampton, England, A Part Interest
[22] Filed: Sept. 15, 1970
[21] Appl. No.: 72,725

[52] U.S. Cl. .................................. 90/13.9, 90/62 R
[51] Int. Cl. ............................................ B23c 1/18
[58] Field of Search ................... 90/13.3, 13.4, 13.6, 90/13.7, 13.9, 62 R

[56] References Cited
UNITED STATES PATENTS
3,601,005  8/1971  McKusick ........................ 90/13.9
3,426,645  2/1969  Williams ........................... 90/13.9

Primary Examiner—Gil Weidenfeld
Attorney—Holman & Stern

[57] ABSTRACT

A copying device for a milling machine having a slide movable along a linear path on a support structure the slide being adapted adjustably to carry a template, a rotary table mounted on the support structure for carrying a workpiece, a drive mechanism connecting the slide with the table, a stylus arranged to engage a template on the slide, and a mechanism whereby movement of the stylus, following the template profile controls the position of a tool which engages the workpiece, adjustment of the template being possible in two planes which are mutually transverse and which are both transverse with respect to the linear path of movement of the template.

3 Claims, 4 Drawing Figures

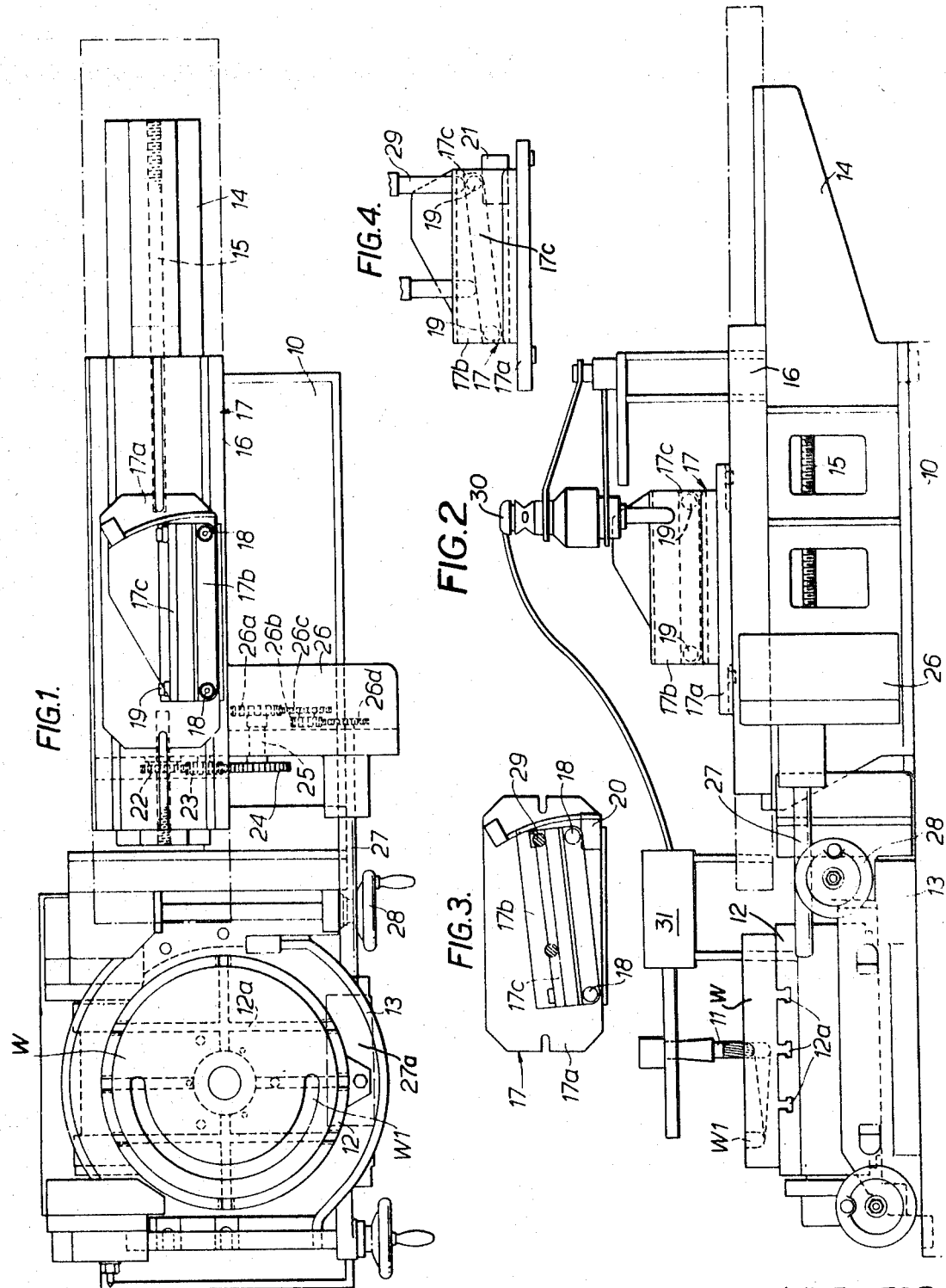

COPYING DEVICES FOR MILLING MACHINES

This invention relates to copying devices for milling machines whereby complex forms can be produced on workpieces by means of a tool which is moved in predetermined manner in accordance with the shape of a template.

The object of the invention is to provide a copying device in a convenient form whereby complex forms can be produced.

According to the present invention a copying device for a milling machine comprises a support structure, a slide which is movable along a linear path on the support structure, means on the slide for mounting a template, said means permitting adjustment of the template relatively to the slide in two planes, both of which are transverse with respect to the direction of slide movement, a rotary table mounted on the support structure, workpiece supporting means on said table, a drive mechanism interconnecting the slide and table whereby movement of the slide along its path is accompanied by proportional rotational movement of the table, a stylus arranged to engage a template on the slide, and a mechanism whereby movements of the stylus are transmitted to means on the machine for controlling the position of the tool axially as well as radially with respect to the axis of rotation of the table.

The invention will now be described by way of example with reference to the accompanying drawings in which:

FIG. 1 is a plan view of a copying device constructed in accordance with the present invention, FIG. 2 is a side elevation view of the device, FIG. 3 is a plan view of the slide portion of the slide with the template support shown in an alternative position, and FIG. 4 is a side elevation view of the slide with the template support in a further alternative position.

The device is intended for use on a milling machine of known kind and having a copying facility. This involves means for controlling movement of a cutting tool 11 in different planes. The milling machine has a machine table indicated at 10 in FIG. 2 and has means indicated diagrammatically in the drawings, for supporting the tool 11 which, in use, is rotated in order to perform a machining operation on a workpiece W.

The tool 11 is mounted upon slide mechanisms of conventional form (not shown) whereby its position in relation to the workpiece can be adjusted in the three mutually perpendicular directions. The tool 11 shown has a radiused end, but it is to be understood that the form of tool used will depend upon the configuration required upon the workpiece W.

The workpiece W is mounted upon a rotary table 12 which in turn is rotatably mounted upon a support 13 secured to the machine table 10.

Extending across the upwardly presented face of the table 12 are slots 12a whereby a workpiece can be secured in position thereon.

Also mounted upon the machine table 10 is a base structure 14 of the device, in which is mounted an horizontally disposed rotatable lead screw 15. Linearly driven by rotation of the lead screw 15 is a slide 16 which is in threaded engagement with the lead screw. On the slide 16 is mounted a template assembly 17. The template assembly 17 is made in three parts identified by 17a, 17b and 17c respectively. The base part 17a is secured on the slide 16. The part 17b is adjustably bolted onto the base part 17a at two spaced positions identified by 18.

The part 17b can be adjusted relatively to the base part 17a by slackening the bolts 18 and moving it to a position such as that shown in FIG. 3 from that of FIG. 1. Either or both of its ends can be moved laterally with respect to the direction of movement of the slide 16. The part 17b has an inverted T-shaped cross-section and the vertical centre portion has secured to it the third part 17c of the template holder 17. FIGS. 2 and 4 illustrate the manner of adjustment of the part 17c relatively to the part 17b. The part 17c is bolted to the part 17b at 19 and can be adjusted by slackening the bolts in a direction which is transverse with respect to the direction of travel of the slide 16. The directions of adjustment of the parts 17b,17c of the template holder are mutually perpendicular directions.

In order to maintain correct adjustment of the part 17b in relation to the part 17a, there is shown in FIG. 3 a spacer block 20 inserted between one of bolts 18 the part 17a. A spacer block 21 is illustrated between the part 17b and one of the bolts 19.

A drive mechanism is provided between the rotary table 12 and the slide 16 in the following manner. On the lead screw 15 is mounted a gear 22 meshing with a gear 23 which in turn meshes with a gear 24 mountedupon a shaft 25 extending out of a gear box 26. A further shaft 27 extends out of the gear box 26 and actuates a drive mechanism 27a whereby the rotary table 12 is rotated.

The gear box may be a step-up or step-down gear box and provision may be made for changing the sizes of the gear wheels. Two meshing sets of gear wheels in the gear box are identified by 26a, b, c and d respectively.

On the support 13 of the rotary table 12 is mounted a hand wheel 28 which is connected through a suitable drive device to the shaft 27 and whereby it can be rotated, and thus the rotary table and slide move.

The proportional linear and rotary movement of the slide and table depend upon the rear ratios in the gear box 27.

Mounted upon a support (not illustrated) on the milling machine, is a stylus 29 (shown in FIGS. 2, 3 and 4 only) which is carried on apparatus including means whereby it is arranged to follow the upwardly presented surface of the part 17c and the laterally present surface of the center portion of the part 17b on the templet holder 17.

This stylus 29, is carried on its support by a mechanism 30 which is coupled, within the milling machine, with a control means 31 for controlling the position of the tool 11. The stylus mechanism 30 is designed, in known manner of copying devices, to produce signals in the tool control means 31 to affect copying of the movement of the stylus 29 by the tool 11. Thus, upward, downward or transverse movement of the stylus 29 in relation to its support, as a result of movement of the template 17 past the stylus, produces equivalent movements of the tool 11. Since the tool engages a workpiece W on a rotating table, transverse movements of the stylus relatively to the linear travel of the slide 16, results in transverse movements of the tool 11 which are in effect movements radially of the table rotational axis. Upward and downward movements of the stylus 29 produce movements of the tool in directions parallel with the axis of the table.

Between the stylus 29 and the tool 11 is a mechanism indicated diagrammatically at 30 whereby movements of the stylus 29 are transmitted to means 31 for controlling the position of the tool 11 both axially and radially with respect to the rotational axis of the table 12.

The arrangement is such that angular off-setting of the template holder as shown in FIG. 3 produces a change in the radial position of the tool 11 with respect to the axis of rotation of the table 12. Moreover, angular off-setting of the part 17c, as shown, in FIG. 4, changes the position of the tool 11 in a direction parallel to the axis of rotation of the table 12.

In use, the slide 16 is moved linearly once only for each complete machining operation on a workpiece. However, the gearing in the gearbox 26 determines the proportional movement of the table 12. Such linear movement of the slide 16 produces movement of the stylus relatively to the template 17 with resulting movement of the tool relatively to the table and any workpiece on it.

In FIGS. 1 and 2 a groove W1 is shown in the workpiece W, such a groove having a varying depth, as well as following a line which is a progressively changing radial distance from the axis of the table 12. Such a groove would be cut if the parts 17b and 17c were set as in FIGS. 3 and 4.

If complex shapes are to be produced, a template mounted upon the parts 17b and 17c and having appropriate shapes on its surface is used. The template has a linear development of the circular, or part-circular shape which is to be produced upon the workpiece W.

A number of workpieces, each with part circular profiles can be machined in succession upon the table, each having its part-circular profile controlled by a respective portion of the template surface.

Progressive movement of the table 12 and slide 16 can be controlled manually through the hand wheel 28, or alternatively in accordance with a predetermined programme through an automatic operating mechanism.

Operation of the slides which carry the tool 11 on the milling machine can be hydraulic.

Having thus described my invention what I claim as new and desire to secure by Letters Patent is:

1. A copying device for a milling machine comprising a support structure, a slide which is movable along a linear path on the support structure, a template mounted on the slide, the template being adjustable relatively to the slide in two planes, both of which are transverse with respect to the direction of slide movement, a rotary table mounted on the support structure, workpiece supporting means on said table, a drive mechanism interconnecting the slide and table whereby movement of the slide along its path is accompanied by proportional rotational movement of the table, the template being engageable by a stylus on the machine, and a mechanism on the machine whereby movements of the stylus produce corresponding control of the position of a tool on the machine in directions axially and radially with respect to the axis of rotation of the table.

2. A copying device as claimed in claim 1 in which the template is a three part assembly, one part being mounted on the slide, and a second part being adjustably connected thereto and a third part adjustably connected to the second part, for adjustment in a direction transverse with respect to the adjustment of the second relatively to the said one part.

3. A copying device as claimed in claim 1 in which the drive mechanism includes a lead screw connected to the slide and gear wheels connecting the lead screw with the table.

* * * * *